United States Patent [19]
Van Horn

[11] 3,827,830
[45] Aug. 6, 1974

[54] INTENSIFIER SYSTEM

[76] Inventor: Robert Eldon Van Horn, 2308 W. Coronado, Orange, Tex. 77630

[22] Filed: May 3, 1972

[21] Appl. No.: 249,958

[52] U.S. Cl............... 417/225, 60/371, 260/94.9, 417/390, 417/392
[51] Int. Cl......................... F04b 17/00, C08d 3/04
[58] Field of Search .......... 417/225, 226, 227, 390, 417/392, 118, 379; 260/94.9; 137/207, 209; 60/371, 372

[56] References Cited
UNITED STATES PATENTS

| | | | |
|---|---|---|---|
| 2,605,612 | 8/1952 | Mason | 60/372 |
| 2,756,562 | 7/1956 | Deitrickson | 60/372 |
| 2,897,762 | 8/1959 | Houvener | 417/392 |
| 2,990,816 | 7/1961 | Vincent | 60/372 |
| 3,299,033 | 1/1967 | Douglas | 260/94.9 M |
| 3,332,273 | 7/1967 | Beche | 60/371 |
| 3,405,522 | 10/1968 | Tomita | 417/339 |
| 3,589,838 | 6/1971 | Tuzson | 417/339 |
| 3,657,210 | 4/1972 | Minkhorst | 260/94.9 P |
| 3,669,572 | 6/1972 | King | 417/390 |

FOREIGN PATENTS OR APPLICATIONS
912,387   4/1954   Germany ........................... 417/392

Primary Examiner—William L. Freeh
Assistant Examiner—G. P. LaPointe
Attorney, Agent, or Firm—Murray Robinson; Ned L. Conley; David Alan Rose

[57] ABSTRACT

An intensifier system for supplying catalyst to a polyolefin reactor wherein the pressure of the olefin is applied to a vessel containing a hydraulic fluid with a pump submerged in the hydraulic fluid, and the pump pressurizes one end of a free piston cylinder to force catalyst from the other end of the cylinder into the reactor. An identical system supplies catalyst to the reactor while the first system is being recharged. Recharging of the system is accomplished by relieving the pressure in the vessel to a low pressure, and applying an intermediate pressure to force catalyst from a catalyst storage container into the catalyst end of the free piston cylinder, thereby causing the hydraulic fluid to flow from the cylinder back into the vessel.

1 Claim, 1 Drawing Figure

PATENTED AUG 6 1974　　　　　　　　　　　3,827,830
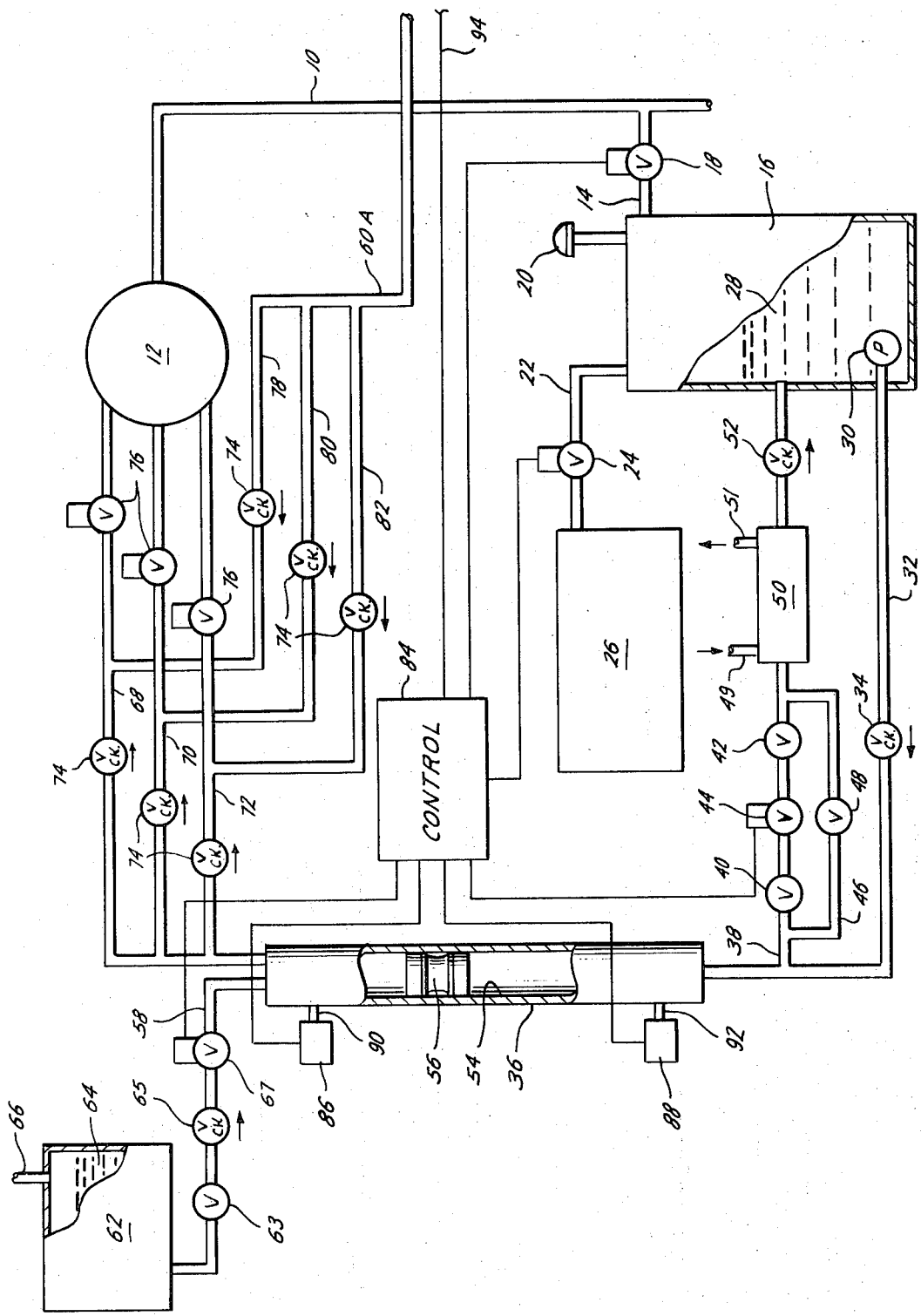

INTENSIFIER SYSTEM

BACKGROUND OF THE INVENTION

1. Field of the Invention

This invention relates to intensifier systems and more particularly it relates to such systems as are useful for feeding catalyst into polyolefin reactors.

2. Description of the Prior Art

One process commercially used for the polymerization of olefins, particularly ethylene, is carried out in a reactor at pressures of 20,000 psi or more, in the presence of a catalyst. Continuous processes involve the continuous injection of gaseous ethylene at substantially the pressure of the reactor, along with continuous injection of the catalytic material. It has been found that it is very difficult to maintain accurate control of the polymerization process unless the flow rate of catalyst into the reactor is very accurately controlled. Best results are obtained if the flow of the catalyst into the reactor is at a substantially constant rate. Heretofore substantially constant flow rates have been obtained by the use of multicylinder reciprocating pumps to pump the catalyst into the reactor. Completely constant flow rates are not obtainable even with such pumps, however, because of pulsation caused by the stroking of the pumps.

Furthermore, such reciprocating pumps have been required to pressurize the catalyst from atmospheric pressure to the 20,000 psi pressure or more needed to inject the catalyst into the reactor. This requires high power consumption and an extremely heavy duty pump.

Pressure intensifiers have heretofore been proposed in which a relatively low pressure fluid is applied to a relatively large diameter piston which drives a relatively small diameter piston. Examples of such intensifiers may be found in U.S. Pat. Nos. 2,631,542 to Groves, 2,652,780 to Adams, 3,086,470 to Skipor et al., 3,234,882 to Douglas et al. and 3,279,381 to Robertson. Such intensifiers are necessarily limited in their capacity per stroke, so that fairly frequent reciprocation is required, thereby giving the same pulsation problem as results from the use of a reciprocating pump.

SUMMARY OF THE INVENTION

According to the present invention the problems hereinbefore enumerated are overcome by utilizing the pressure of the olefin as the primary energy source for pressurizing the catalyst to a pressure sufficient for it to be fed to the reactor. In the preferred embodiment of the invention the constantly applied pressure of the olefin is intensified and applied to the catalyst so that a constant pressure on the catalyst will insure continuous smooth flow of catalyst into the reactor. Other features of the invention pointed out in the claims can best be understood by reference to the following detailed description of a preferred embodiment.

BRIEF DESCRIPTION OF THE DRAWING

The single FIGURE of the drawing shows a schematic diagram of a preferred embodiment of the apparatus of this invention, which is suitable for practice of the process of this invention.

DESCRIPTION OF THE PREFERRED EMBODIMENT

The apparatus shown in the drawing comprises one half of the entire system required for feeding catalyst to the reactor, another system identical thereto being preferably provided to feed the catalyst while the first system is being recharged.

As shown in the drawing, ethylene or other olefin, under pressure of 20,000 psi or more, is supplied through the conduit 10 to the reactor 12. A conduit 14 leads from the conduit 10 to a pressure vessel 16, a remotely controllable valve 18, such as a solenoid valve or other power-operated valve, being provided in the conduit 14. The pressure vessel is preferably provided with a safety valve or pressure disc 20, and has a conduit 22 leading through remotely controllable valve 24 to a header 26 which is maintained at a low pressure, as for example 4 psi.

The vessel 16 is partially filled with a hydraulic fluid 28, and a pump 30 is located in a lower portion of the vessel so that it is submerged in the hydraulic fluid. Any suitable pump may be used for the purpose, as for example the gear pump with submersible motor which is made by EMD Components, Inc. of Wickliffe, Ohio. Alternatively, the pump could be placed so that it is not submerged in the hydraulic fluid, but is still subject to the pressure of the ethylene, and the pump's suction connection would be arranged so that the pump would take suction from the hydraulic fluid.

The pump discharges into a conduit 32, provided with a check valve 34 to prevent flow back toward the vessel 16, into the lower end of a free-piston cylinder 36. A conduit 38 leads from the conduit 32 adjacent the lower end of the cylinder 36 back into the vessel 16. In the embodiment shown in the drawing, conduit 38 is provided with manually operable valves 40 and 42 on either side of a remotely controllable valve 44, and a bypass line 46 containing a manually operable valve 48 is provided around the valves 40, 42 and 44. The conduit 38 is also provided with a cooling jacket 50 having coolant lines 49 and 51 and a check valve 52.

The cylinder 36 carries within its bore 54 a free piston 56. The upper end of the bore 54 communicates with conduits 58 and 60. Conduit 58 leads to a catalyst storage container 62, and is provided with a manually operable valve 63, a check valve 65, and a remotely controllable valve 67.

The catalyst container 62 contains catalyst material 64 which may, for example, be covered by a blanket of nitrogen at a pressure intermediate the pressure in the ethylene line 10 and that in the header 26, as for example about 30 psi. A line 66 is provided for charging nitrogen into the container 62.

The line 60, in the embodiment shown in the drawing, leads to conduits 68, 70 and 72, which lead into various zones of the reactor 12, as is well known in the art. Each of the lines 68, 70 and 72 is provided with a check valve 74 and with a valve 76 for controlling the flow of catalyst to each of the zones of the reactor.

Conduits 78, 80 and 82 are connected to the conduits 68, 70 and 72, respectively, intermediate the valves 74 and the valves 76, and provide means through which catalyst may be fed to the reactor from a conduit 60A leading from a system identical to that disclosed in the drawing. The conduits 78, 80 and 82 are also provided with check valves 74.

A suitable control 84, of a type well known in the art, is connected to the valves 18, 24, 44 and 68, and to sensors 86 and 88 mounted on the cylinder 36 adjacent each end thereof. The sensors are provided with probes 90 and 92, respectively, which extend through the wall of the cylinder 36 for actuation by the free piston 56. A conductor 94 is provided between the control 84 and a similar control (not shown) in the duplicate system.

In the preferred manner of operation of the apparatus of the embodiment shown in the drawing, ethylene or other olefin is fed to the reactor 12 through the line 10 at, for example, 20,000 psi or more. High pressure ethylene from this line is also delivered to the vessel 16 through the conduit 14. As the operation of this half of the system begins, valve 18 and the valves 76 are open and the other valves shown in the drawing are closed. Valves 76 are adjusted so as to provide the desired flow rate of catalyst into the reactor at each of the various zones. Valve 48 may also be partially open to allow recycling as necessary to adjust the total flow rate of catalyst.

Under these conditions the ethylene applies the high pressure of conduit 10 to the hydraulic fluid in the vessel 16, so that this is the suction pressure of the pump 30. The pump 30 boosts the pressure of the hydraulic fluid, pumping it through the conduit 32 to the lower end of the cylinder 36. Thus the piston 56 applies a pressure to the catalyst which is greater than the ethylene pressure by the amount of pressure differential provided by the pump 30, less losses in the lines and the cylinder, so that catalyst is injected into the reactor through lines 60, 68, 70 and 72. The amount of pressure boost required is not large, and may be as little as 50 psi, so very little power is required to drive the pump 30. Since the pump 30 is surrounded by high pressure fluid, it need not be of heavy duty construction.

As the piston 56 moves upwardly it eventually contacts the probe 90, causing the sensor 86 to generate a signal which is delivered to the control 84. This signal causes the control 84 to feed a signal through the conductor 94 to the duplicate system to cause this system to start feeding catalyst to the reactor. At the same time a signal is provided to valve 18 to close this valve, and to valves 24, 44 and 67 to open these valves, allowing the ethylene in the upper portion of the vessel 16 to bleed off through the valve 24 into the header 26. The pump 30 may also be caused to stop, although it may, under some conditions, be allowed to run continuously. The lowering of the pressure in the vessel 16 to substantially the pressure of the header reduces the pressure in the cylinder 36 and the connecting lines, thereby allowing the pressure of the nitrogen blanket in the container 62 to force catalyst from this container into the upper end of the cylinder 36, moving the piston 56 downwardly and causing hydraulic fluid to be forced from the cylinder, through the valve 44 and the water jacket 50 into the vessel 16. Water jacket 50 is provided to cool the hydraulic fluid to remove any heat added to it by virtue of the pumping action. The vessel 16 is thereby maintained at the desired temperature.

The particular pressures used in header 26 and in the catalyst storage container 62 are not important. It is only necessary that the differential pressure between the container 62 and the header 26 be enough to allow the recharging operation to be completed during the period of injection of catalyst by the other half of the system. Thus the header may be at or slightly above the pressure of the ethylene feed to the compressors, so that the ethylene discharged from the vessel 16 may be returned to the feed. For the purposes of this specification, it is only necessary that the header pressure be considered as relatively low as compared to the pressure of conduit 10, and that the catalyst container be intermediate these.

When the piston 56 approaches the lower end of the cylinder 36, it contacts the probe 92 which causes a signal to be generated in the sensor 88, which signal, when delivered to the control 84, results in a single closing valves 24, 44 and 67.

This half of the pumping system remains in this condition until a signal is received from the other half of the system through conductor 94 that the free piston in that half of the system has reached the upper end of the corresponding cylinder, whereupon valve 18 is opened, the pump 30 restarted, and the free piston 56 again begins to move upwardly to force catalyst into the reactor.

The hydraulic fluid utilized in the vessel 16 may be glycerin, mineral oil or any other liquid which is substantially inert to reaction with the ethylene or with any catalyst which may leak past the piston 56. Preferably the hydraulic fluid has a viscosity somewhat higher than that of the carrier for the catalyst so that if there is any leakage past the free piston 56, it is more likely to be from the catalyst side to the hydraulic fluid side, thereby reducing the possibility of contamination of the reactor. The hydraulic fluid should be sampled from time to time to determine whether any substantial amount of catalyst has leaked into the hydraulic fluid system, so that polymerization of the ethylene in the vessel 16 can be avoided. Temperature control by virtue of the cooling water jacket 50 also assists in avoiding any such polymerization.

The valves 40 and 42 in the conduit 38 are normally left open, but may be closed when necessary to remove the valve 44 for repairs.

During the time the system disclosed in the drawing is waiting on the other half of the system to finish feeding catalyst to the reactor, the valve 44 may be left open and the pump 30 may continue to run, so that hydraulic fluid is continuously circulated.

It will be appreciated that the free-piston cylinder allows continuous, constant flow feeding of the catalyst for a substantial period of time, dependent upon the size of the cylinder and the feed rate required by the reactor. The only fluctuation encountered is that occurring at the completion of each free-piston stroke, which may be at intervals of as much as twenty minutes or more. Thus flow-rate fluctuations such as result from the use of multicylinder reciprocating pumps are substantially avoided.

It will be apparent to those skilled in the art that many variations of the apparatus disclosed as the preferred embodiment may also be used. Accordingly, the invention is not to be construed to be limited to the specific embodiment shown and described but only as set forth by the appended claim.

I claim:

1. Apparatus comprising
   a high pressure olefin polymerization reactor,
   a source of olefin under high pressure, means connecting said source to said reactor, whereby olefin at said high pressure may be supplied to said reactor, a pressure-tight vessel, a conduit connecting said source to said vessel whereby olefin at said high pressure may be supplied to said vessel, valve means in said conduit operable to allow and prevent flow to said vessel, a pump in said vessel having its suction line open to a lower portion of the vessel, a low-pressure header, a second conduit connecting said header to an upper portion of said vessel, valve means in said second conduit operable to allow and prevent communication between said vessel and said header, a free-piston cylinder, a third conduit connecting the discharge line of said pump to one end of said cylinder, valve means in said third conduit operable to prevent flow therethrough toward said pump, a fourth conduit connecting said one end of said cylinder to said vessel, valve means in said fourth conduit operable to regulate flow from said one end of said cylinder toward said vessel and to prevent flow therethrough from said vessel toward said one end of said cylinder, a source of catalyst at intermediate pressure, a fifth conduit connecting said catalyst source to the other end of said cylinder, valve means in said fifth conduit operable to allow and prevent communication between said catalyst source and said cylinder, a sixth conduit connecting said other end of said cylinder to said reactor, valve means in said sixth conduit operable to prevent flow from said reactor toward said cylinder, and control means connected to said valve means, said control means having a first position in which the valve means are operated to allow flow from said olefin source to said vessel, from said pump to said one end of said cylinder, and from said other end of said cylinder to said reactor, while preventing flow between said vessel and said header, said vessel and said one end of said cylinder, and said other end of said cylinder and said catalyst source, and having a second position in which the valve means are operated to allow flow from said catalyst source to said other end of said cylinder, from said one end of said cylinder to said vessel, and from the upper portion of said vessel to said header, while preventing flow from said reactor to said other end of said cylinder, from said one end of said cylinder to said pump, and from said olefin source to said vessel.

* * * * *